United States Patent [19]

Takehara et al.

[11] Patent Number: 5,145,205
[45] Date of Patent: Sep. 8, 1992

[54] VEHICLE SUSPENSION SYSTEM

[75] Inventors: Shin Takehara; Toshiki Morita, both of Hiroshima, Japan

[73] Assignee: Mazda Motor Corporation, Hiroshima, Japan

[21] Appl. No.: 552,004

[22] Filed: Jul. 13, 1990

[30] Foreign Application Priority Data

Jul. 14, 1989 [JP] Japan .................... 1-181688

[51] Int. Cl.⁵ .................................. B60G 11/26
[52] U.S. Cl. .................... 280/707; 280/708; 280/714; 267/64.25
[58] Field of Search ........... 280/707, 708, 709, 714, 280/6.12; 267/64.25, 64.28

[56] References Cited

U.S. PATENT DOCUMENTS

| | | | |
|---|---|---|---|
| 3,499,639 | 3/1970 | Bonnotte | 267/64.23 |
| 3,536,311 | 10/1970 | Capgras | 267/64.23 |
| 3,945,664 | 3/1976 | Hiruma | 280/708 |
| 4,478,431 | 10/1984 | Muller et al. | 280/708 |
| 4,655,440 | 4/1987 | Eckert | 280/708 |
| 4,938,499 | 7/1990 | Kawabata | 280/707 |
| 4,967,360 | 10/1990 | Fukunaga | 280/707 |

FOREIGN PATENT DOCUMENTS 61-6013  1/1986  Japan .

Primary Examiner—Charles A. Marmor
Assistant Examiner—P. Dickson
Attorney, Agent, or Firm—Sixbey, Friedman, Leedom & Ferguson

[57] ABSTRACT

A vehicle suspension system has liquid pressure cylinder devices provided between the respective wheels and the vehicle body. Supply and discharge of hydraulic liquid to and from the liquid pressure cylinder devices is controlled according to the running condition of the vehicle. Each of the liquid pressure cylinder devices communicates with a pair of gas springs, each having a gas chamber and a liquid chamber parted from each other by a movable member. The liquid chamber communicates with the liquid pressure chamber of the liquid pressure cylinder device by way of a communicating passage, and the gas chamber is filled with gas. The initial pressure of one of the gas springs is higher than that of the other.

7 Claims, 3 Drawing Sheets

VEHICLE SUSPENSION SYSTEM

BACKGROUND OF THE INVENTION

1. Field of the Invention

This invention relates to a vehicle suspension system, and more particularly to an active suspension system comprising a fluid pressure cylinder device provided between each wheel and a vehicle body.

2. Description of the Prior Art

As disclosed, for instance, in U.S. Pat. No. 4,830,397, there has been proposed a so-called active suspension which comprises fluid pressure cylinder devices provided between the respective wheels and the vehicle body and in which supply and discharge of hydraulic fluid to and from the fluid pressure cylinder devices (will be simply referred to as "fluid supply to the fluid pressure cylinder devices", hereinbelow) is controlled according to the running condition of the vehicle to afford better driving comfort and better running stability.

In such an active suspension system, a control system controls fluid supply to the fluid pressure cylinder devices according to a predetermined control program on the basis of signals from various vehicle condition detecting means. The suspension properties of the suspension system can be changed by changing the control pattern of fluid supply to the fluid pressure cylinder devices so that, for instance, suspension properties in which importance is attached to the driving comfort or suspension properties in which importance is attached to the running stability can be obtained as desired.

As one of such active suspension systems, there has been known one in which a gas spring is provided for each fluid pressure cylinder device in communication therewith. With this arrangement, control of fluid supply to the fluid pressure cylinder devices is facilitated since the air springs absorb high-frequency vibrations such as road noise and accordingly control of fluid supply to the fluid pressure cylinder devices may solely depends upon displacements of the vehicle body at a low frequency (e.g., lower than 5 Hz) generated by operation of the driver such as rolling of the vehicle body.

In such an active suspension system, the conditions of the gas springs (the volume of the gas chamber, the pressure receiving area and the initial pressure) should be set on the basis of load acting on the wheels in state where the vehicle body is at rest horizontally (to be referred to as "1G state", hereinbelow), and the suspension stroke. However, since the volume of the gas chamber is limited by the space where the gas spring is disposed, the conditions of the gas springs are set solely on the basis of the volume of the gas chamber limited by the space where the gas spring is disposed and the stroke of wheel displacement when the vehicle moves to the normal running state from the 1G state. However, depending on the running condition, the fluid pressure in the fluid pressure cylinder devices can fall excessively, and the system is generally arranged so that it interrupts the control in order to prevent occurrence of damage when the fluid pressure in the fluid pressure cylinder devices becomes excessively low.

This arrangement gives rise to the following problem. That is, for example, when the pressure in the fluid pressure cylinder devices for the inner wheels reaches the threshold pressure (release limit pressure) while the vehicle is making a sharp turn, the control is interrupted at the moment. When the control is interrupted in the course of a turning, the vehicle body begins to roll toward the outer side of the turning (basically does not roll when it is under control) in the range of the suspension stroke and the fluid pressure in the fluid pressure cylinder devices for the inner wheels falls below the initial pressure of the gas springs communicating with the fluid pressure cylinder devices, whereby the grounding load of the inner wheels is nullified. When the inner wheel the grounding load of which is nullified is a driving wheel, the inner driving wheel races and the outer driving wheel is not driven by the action of the differential, whereby the driving force is removed in the course of the turning and the vehicle can spin. These problems can be avoided when the volume of the gas chamber and the pressure receiving area of the gas spring are sufficiently large (i.e., when the initial pressure is sufficiently low), which is very difficult to realize due to the limited space as described above.

SUMMARY OF THE INVENTION

In view of the foregoing observations and description, the primary object of the present invention is to provide an active suspension system which can maintain a grounding pressure and permit the vehicle to continue the turn in a stabilized state even if the control is interrupted during a turn.

The active suspension system in accordance with the present invention is characterized in that each of the fluid pressure cylinder devices provided between the wheels and the vehicle body communicates with a pair of gas springs having different initial pressures.

The initial pressure of one of the gas springs is set to the value obtained by subtracting the variation of pressure in the hydraulic cylinder device which occurs during normal running from the pressure in the hydraulic cylinder device when the vehicle is in the 1G state. The initial pressure of the other gas spring is set to be not larger than the value obtained by subtracting from the initial pressure of said one gas spring the variation of pressure in the hydraulic cylinder device which occurs when the suspension rebounds in full stroke (to the position in which the hydraulic cylinder device extends to the limit) from the full bump state (the state in which the hydraulic cylinder device is retracted to the limit). With this arrangement, even if the control is interrupted and the urging force of said one gas spring which absorbs vibrations and impacts on the vehicle body is nullified, the grinding pressure is maintained by said the other gas spring and the driving wheel is prevented from racing.

DESCRIPTION OF THE PREFERRED EMBODIMENT

Figure 1:
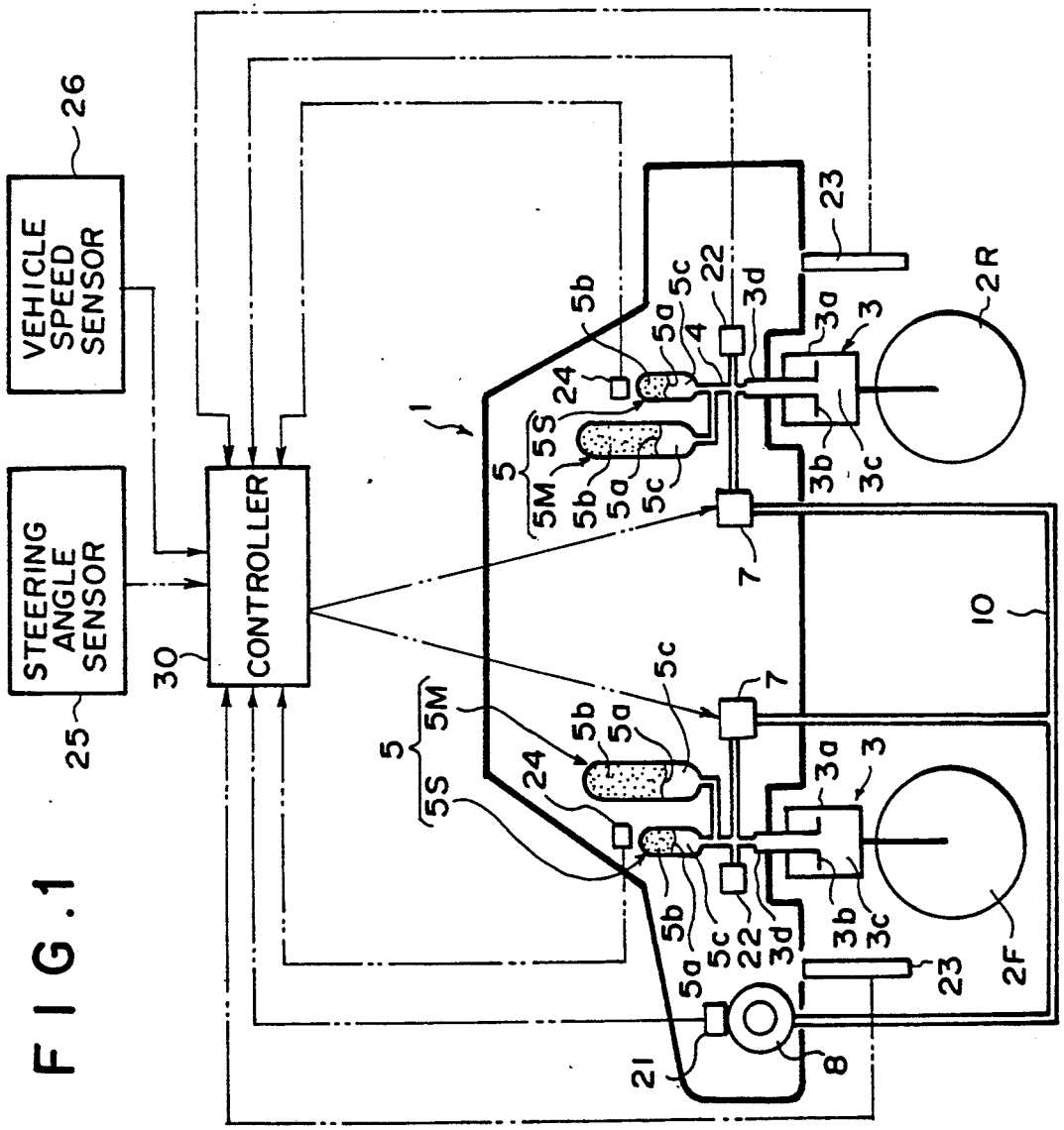
FIG. 1 is a schematic side view of a vehicle provided with an active suspension system in accordance with an embodiment of the present invention.

Though only the left side of the vehicle is shown in FIG. 1, the right side is of the similar structure.

In FIG. 1, a hydraulic cylinder 3 is provided between the vehicle body 1 and each of front and rear wheels 2F and 2R. The hydraulic cylinder device 3 is a so-called single-acting power cylinder, and a hydraulic pressure chamber 3c is defined in the cylinder tube 3a by piston 3b slidably received therein. A piston rod 3d is connected to the piston 3b at its lower end and to the vehicle body 1 at its upper end. The cylinder tube 3a is connected to the wheel.

The hydraulic pressure chamber 3c communicates with a gas spring system 5 through a communicating passage 4. The gas spring system 5 comprises a main gas spring 5M and a sub gas spring 5S which differ from each other in initial pressure. The main gas spring 5M has a gas chamber 5b and an oil chamber 5c parted by a diaphragm 5a a piston may be used instead of the diaphragm 5a. Inert gas such as nitrogen gas has been enclosed in the gas chamber 5b under a predetermined pressure. The oil chamber 5c communicates with the hydraulic pressure chamber 3c of the hydraulic cylinder device 3 through the communicating passage 4 and the piston 3b.

Each hydraulic cylinder device 3 is connected to a hydraulic pump 8 through an oil supply line 10. A flow control valve 7 is provided in the supply line 10 for each hydraulic cylinder device 3 and controls flow of hydraulic oil supplied to the hydraulic cylinder device 3 or discharged from the same.

The hydraulic pump 8 is provided with a discharge pressure gauge 21 which detects the amount of the hydraulic oil discharged from the pump 8. Each hydraulic cylinder device 3 is provided with a hydraulic pressure sensor 22 which detects the pressure in the hydraulic pressure chamber 3c. Further, a vehicle level sensor 23 which detects the stroke of the hydraulic cylinder device 3 and detects the vertical displacement of the vehicle body relative to the wheel is provided for each hydraulic cylinder device 3. Further three vertical acceleration sensors 24 which detects the vertical acceleration of the vehicle body, i.e., the acceleration of the suspended portion on the wheels 2, are provided substantially on the same horizontal plane, two above the respective front wheels 2F and the other (not shown) at the center between the rear wheels 2R. Further, a steering angle sensor 25 and a vehicle speed sensor 26 are provided.

The detecting signals of the aforesaid sensors, i.e., the discharge pressure gauge 21, the hydraulic pressure sensor 22, the vehicle level sensors 23, the vertical acceleration sensors 24, the steering angle sensor 25 and the vehicle speed sensor 26, are input into a controller 30 comprising a CPU. The controller 30 executes calculations according to a predetermined program on the basis of the detecting signals and controls the flow control valves 7 to change the hydraulic pressure supplied to each hydraulic cylinder device 3, thereby controlling the suspension properties so that the vehicle can run constantly in a stabilized state.

Figure 2:
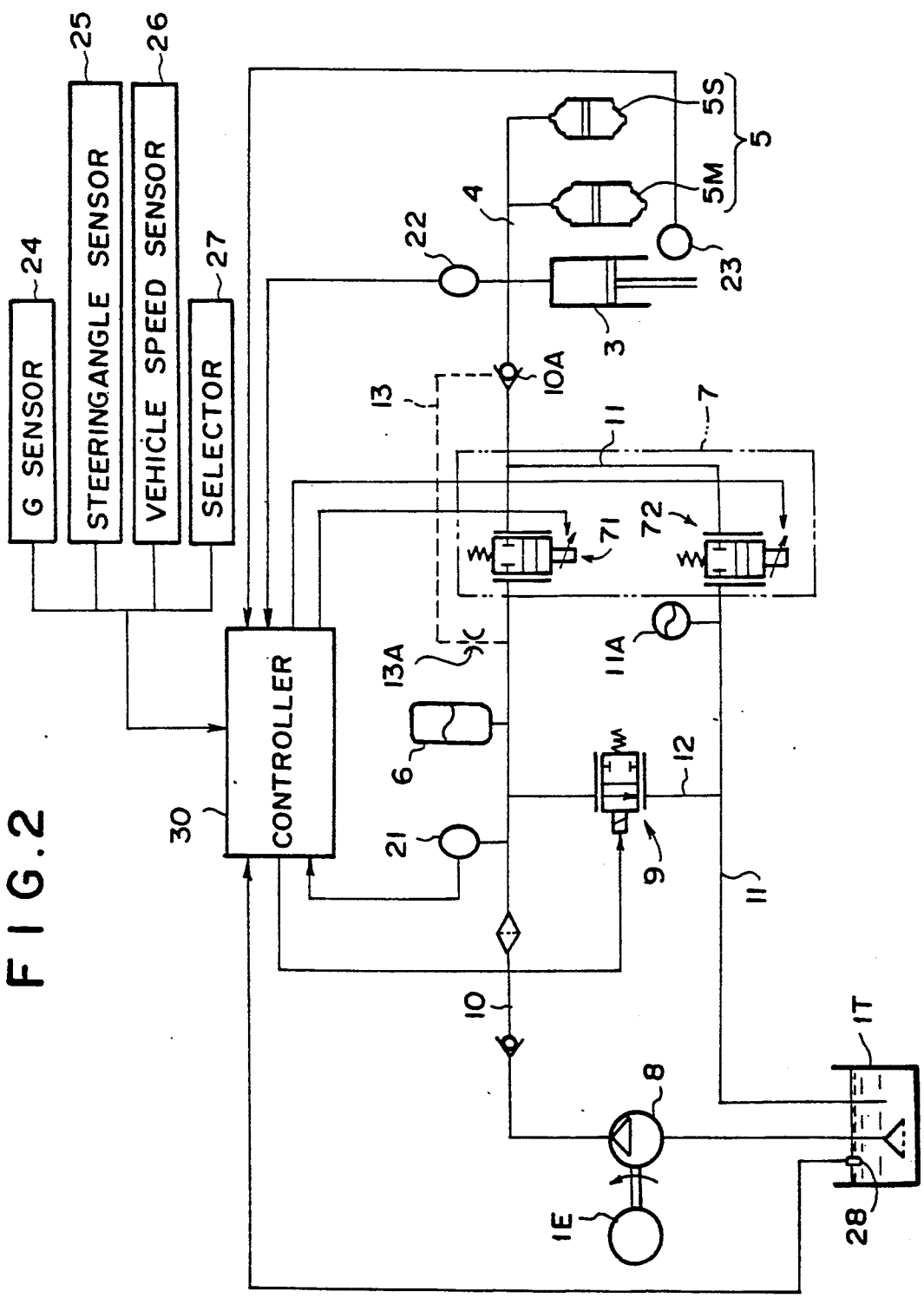
FIG. 2 shows the hydraulic circuit of the active suspension system.

In FIG. 2, as for the part downstream of a main accumulator 6 (to be described later), only that for one wheel is illustrated, but the same circuits are provided for all the front and rear wheels 2F and 2R and are connected in parallel.

The hydraulic pump 8 is of a variable capacity type and is driven by the engine 1E. The pressurized hydraulic oil discharged from the hydraulic pump 8 flows to the flow control valve 7 through the oil supply line 10. The flow control valve 7 selectively supplies the hydraulic oil to the hydraulic cylinder device 3 or discharges the same through a discharge line 11 under the control of the controller 30.

The flow control valve 7 comprises a pair of two-port two-position servo valves 71 and 72 each of which takes a closing position in which it closes the ports and an opening position in which it opens the ports, and has a built-in differential pressure valve which can hold the hydraulic pressure at a predetermined value when the servo valve is in the opening position. The servo valve 71 is provided in the supply line 10 so that the supply line 10 is opened when it is in the opening position, and the servo valve 72 is provided in the discharge line 11 so that the discharge line 11 is opened when it is in the opening position. The discharge line 11 branches off from the supply line 10 at a portion upstream of the servo valve 71 and communicates with a reservoir 1T through the servo valve 72.

The supply line 10 is provided with the main accumulator 6 upstream of the flow control valve 7, and is connected at a portion upstream of the main accumulator 6 to the discharge line 11 through a bypass line 12 provided with a two-port two-position fail-safe valve 9.

The fail-safe valve 9 opens and causes the hydraulic oil in the main accumulator 6 to return to the reservoir 1T through the bypass line 12.

A pilot-pressure-responsive check valve 10A is provided in the supply line 10 between the servo valve 71 and the hydraulic cylinder device 3. To the check valve 10A is applied a hydraulic pressure in the supply line 10 upstream of the flow control valve 7 through a pilot line 13 as the pilot pressure. When the pilot pressure is lower than a predetermined value, the check valve 10A is closed, That is, only when the pressure in the supply line 10 upstream of the flow control valve 7 (main pressure) is not lower than the predetermined value, supply and discharge of the hydraulic oil to and from the hydraulic cylinder device 3 is permitted. Reference numeral 13A denotes an orifice which is provided in the pilot line 13 and delays closure of the check valve 10A when the fail-safe valve 9 opens.

The circuits for the other wheels branch off from the supply line 10 at a portion downstream of the main accumulator 6.

An accumulator 11A is provided in the discharge line 11 downstream of the servo valve in order to prevent water hummer phenomenon from occurring upon opening of the valve 72.

Reference numeral 28 denotes a liquid level sensor which detects the amount of hydraulic oil in the reservoir 1T and the detecting signal of the liquid level sensor 28 is also input into the controller 30.

Further a select signal from a selector 27 for selecting a desired suspension property is input into the controller 30.

Though the control of supply and discharge of the hydraulic oil to and from the hydraulic cylinder device 3 by the controller 30 will not be described in detail here, basically the control comprises a control for controlling the vehicle level to a target level on the basis of the detecting signals from the vehicle level sensors 23, a control for controlling the vehicle level changing speed on the basis of the vehicle level changing speed signal obtained by differentiating the detecting signals from the vehicle level sensors 23, a control for suppressing vertical vibrations of the vehicle body on the basis of the detecting signals from the three vertical acceleration sensors 24 (only two shown), and a control for calculating the twist of the vehicle body on the basis of the detecting signals from the hydraulic pressure sensors 22 and controlling the twist of the vehicle body.

The controller 30 interrupts the control when the pressure in the hydraulic cylinder devices 3 falls below a predetermined pressure.

The predetermined pressure below which the control is to be interrupted is referred to as "the threshold pressure" or "the release limit pressure". The initial pressure PM of the main gas spring 5M and the initial pressure PS of the sub gas spring 5S are set as follows with respect to the release limit pressure P.

$$PM = 1GP - \beta \leq P \ (kg/cm^2)$$

$$PS \leq PM - \alpha (kg/cm^2)$$

In the above formulae, 1GP represents the pressure in the hydraulic cylinder device 3 in the 1G state, u represents the variation of pressure in the hydraulic cylinder device 3 which occurs when the suspension rebounds in full stroke (to the position in which the hydraulic cylinder device 3 extends to the limit) from the full bump state (the state in which the hydraulic cylinder device 3 is retracted to the limit), and $\beta$ represents the variation of pressure in the hydraulic cylinder device 3 which occurs during normal running. For example, the volumes of the respective gas springs 5M and 5S may be 150 cc and 100 cc, and the initial pressures of the respective gas springs 5M and 5S may be 40 kg/cm$^2$ and 12 kg/cm$^2$.

The spring properties of the overall gas spring system 5 is obtained by synthesizing the spring properties of the main gas spring 5M and the sub gas spring 5S.

Figure 3B:
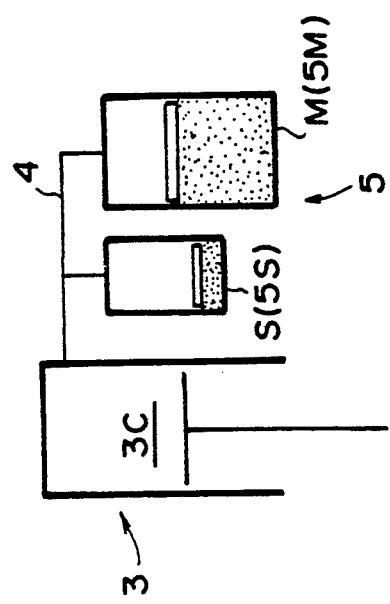
FIG. 3B is a schematic view showing the condition of the gas spring in the 1G state.
Figure 3A:
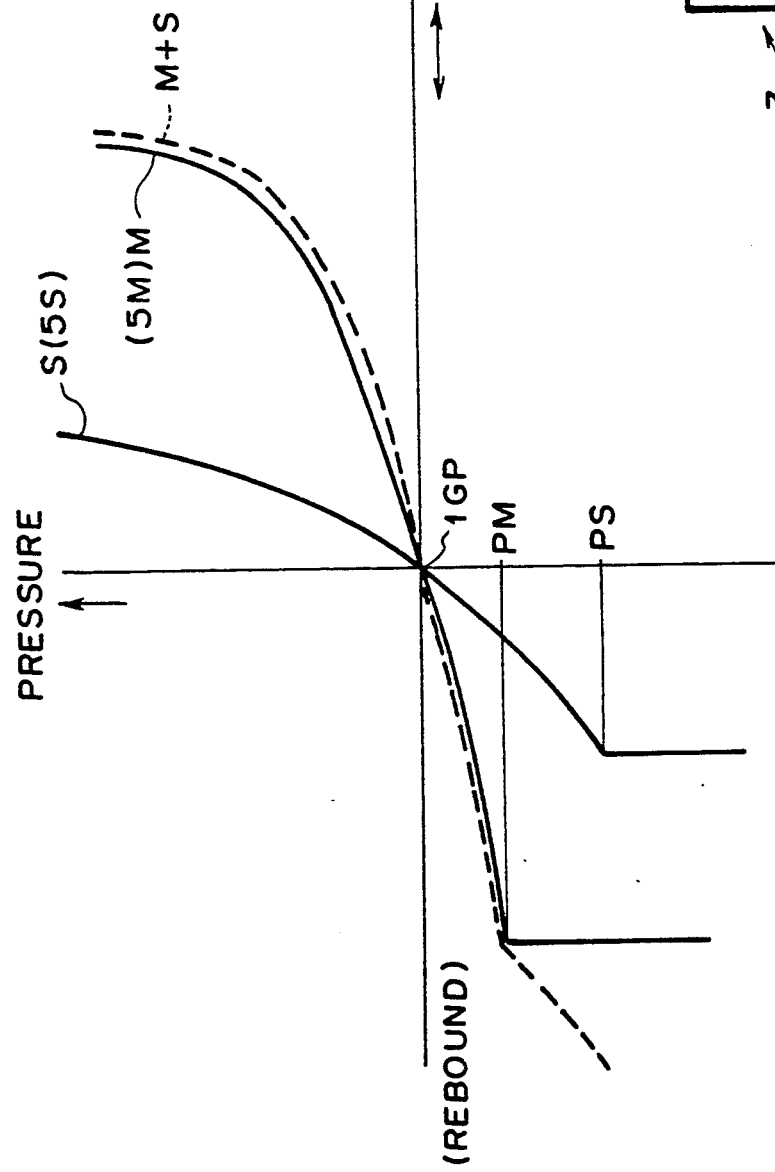
FIG. 3A is a graph showing the spring properties of the gas spring.

The spring constant of a gas spring depends upon the volume of the gas spring and the compression ratio, and gradually increases with increase of the compression ratio. Accordingly, as shown in FIG. 3A, in the 1G state, the spring constant of the sub gas spring 5S is large and that of the main gas spring 5M is small. However, when the initial pressure of the sub gas spring 5S is set as low as possible relative to the initial pressure of the main gas spring 5M, the spring properties of the overall gas spring system 5 can substantially follow the spring properties of the main gas spring 5M as shown by the broken line in FIG. 3A and is not substantially affected by the spring properties of the sub gas spring 5S. That is, when the initial pressure of the sub gas spring 5S is sufficiently low, the gas spring system 5 can be set in a state where only the main gas spring 5M can act as a spring while the sub gas spring 5S is retracted to the limit and cannot act as a spring as shown in FIG. 3B.

In order to improve response of the gas spring system 5 to vibrations and improve the driving comfort, it is preferred that the spring constant of the main gas spring 5M be small in the 1G state. Since the initial pressure of the main gas spring 5M may be about the pressure in the hydraulic cylinder device 3 in the 1G state, the spring constant of the main gas spring 5M in the 1G can be reduced without substantially increasing the volume of the main gas spring 5M.

That is, the change of the spring constant of the gas spring system 5 is small in the normal operating range though its total volume is relatively small and the initial pressures of each of the gas springs is relatively low. Further, the gas spring system 5 can act as a spring even if the pressure in the hydraulic cylinder device 3 falls below the initial pressure of the main gas spring 5M so long as it does not fall below the initial pressure of the sub gas spring 5S.

In accordance with the arrangement described above, even if the pressure in the hydraulic cylinder device 3 falls below the release limit pressure and the control is interrupted so that the vehicle body rolls to such an extent that the urging force of the main gas spring 5M is nullified, the grinding pressure is maintained by the sub gas spring 5S and the driving wheel is prevented from racing.

Since the spring constant is reduced when the pressure of the gas spring system 5 is low, the vehicle body is transitionally apt to lift during rolling. However, at the pressure lower than the initial pressure of the main gas spring 5M, only the sub gas spring 5S acts and accordingly the spring constant is increased, whereby the lift of the vehicle body is limited.

Though, in the embodiment described above, the gas spring system 5 comprises a pair of gas springs, it may comprise three or more gas springs.

We claim:

1. A vehicle suspension system which comprises liquid pressure cylinder devices provided between the respective wheels and the vehicle body, a vehicle level sensor means which detects the vehicle height on each wheel and an attitude control system which controls supply and discharge of hydraulic liquid to and from the liquid pressure cylinder devices on the basis of a detecting signal of the vehicle level sensor means so that the attitude of the vehicle body during running is stabilized, the attitude control by the attitude control system being interrupted in a particular running condition wherein each of the liquid pressure cylinder devices communicates with a pair of gas springs, each having a gas chamber and a liquid chamber parted from each other by a movable member, the liquid chamber communicating with a liquid pressure chamber of an associated liquid pressure cylinder device by way of a communicating passage, the gas chamber being filled with gas, and the initial pressure of one of the gas springs being higher than that of the other and the initial pressure of said one gas spring is lower than a minimum value of the pressure attained in the liquid pressure cylinder device during the attitude control by the attitude control system.

2. A vehicle suspension system as defined in claim 1 in which the volume of said the other gas spring is smaller than that of said one gas spring.

3. A vehicle suspension system as defined in claim 1 in which the initial pressure of the other gas spring is lower than the initial pressure of said one gas spring by a predetermined value.

4. A vehicle suspension system as defined in claim 3 in which said predetermined value is the variation of pressure in the liquid pressure cylinder device which occurs when the suspension rebounds to the position in which the liquid pressure cylinder device extends to the limit from the state in which the liquid pressure cylinder device is retracted to the limit.

5. A vehicle suspension system which comprises liquid pressure cylinder devices provided between the respective wheels and the vehicle body and in which supply and discharge of hydraulic liquid to and from the liquid pressure cylinder devices is controlled according to the running condition of the vehicle, characterized in that each of the liquid pressure cylinder devices communicates with a pair of gas springs, each having a gas chamber and a liquid chamber parted from each other by a movable member, the liquid chamber communicating with a liquid pressure chamber of an associated liquid pressure cylinder device by way of a communicating passage, the gas chamber being filled with gas, and the initial pressure of one of the gas springs being higher than that of the other and lower than a minimum value of the pressure attained in the liquid pressure cylinder device during the attitude control by the attitude control system.

6. A vehicle suspension system as defined in claim 5 in which the initial pressure of the other gas spring is lower than the initial pressure of said one gas spring by a predetermined value.

7. A vehicle suspension system as defined in claim 6 in which said predetermined value is the variation of pressure in the liquid pressure cylinder device which occurs when the suspension rebounds to the position in which the liquid pressure cylinder device extends to the limit from the state in which the liquid pressure cylinder device is retracted to the limit.

* * * * *